United States Patent
Gehrmann et al.

(10) Patent No.: US 10,574,452 B2
(45) Date of Patent: Feb. 25, 2020

(54) TWO-STEP CENTRAL MATCHING

(71) Applicant: Fingerprint Cards AB, Göteborg (SE)

(72) Inventors: Christian Gehrmann, Lund (SE); Steven Pope, Holte (DK)

(73) Assignee: Fingerprint Cards AB, Göteborg (SE)

(*) Notice: Subject to any disclaimer, the term of this patent is extended or adjusted under 35 U.S.C. 154(b) by 0 days.

(21) Appl. No.: 16/381,483

(22) Filed: Apr. 11, 2019

(65) Prior Publication Data
US 2019/0238328 A1 Aug. 1, 2019

Related U.S. Application Data

(63) Continuation of application No. 16/117,552, filed on Aug. 30, 2018, now Pat. No. 10,305,690.

(30) Foreign Application Priority Data

Nov. 29, 2017 (SE) ...................................... 1751469

(51) Int. Cl.
*H04L 29/06* (2006.01)
*H04L 9/08* (2006.01)

(52) U.S. Cl.
CPC .......... *H04L 9/0866* (2013.01); *H04L 63/061* (2013.01); *H04L 63/123* (2013.01)

(58) Field of Classification Search
CPC ..... G06F 21/32; H04L 9/0866; H04L 9/3231; H04L 63/061; H04L 63/123; H04L 63/0861
See application file for complete search history.

(56) References Cited

U.S. PATENT DOCUMENTS 7,181,017 B1    2/2007  Nagel et al.
9,436,864 B2    9/2016  Gozzini
(Continued)

FOREIGN PATENT DOCUMENTS

| WO | 2009073144 A2 | 6/2009 |
| WO | 2009115611 A2 | 9/2009 |
| WO | 2016128906 A1 | 8/2016 |

OTHER PUBLICATIONS

Martinez, D. et al., "Secure Crypto-Biometric System for Cloud Computing", Securing Services on the Cloud (IWSSC), 2011, pp. 38-45.
(Continued)

*Primary Examiner* — Yogesh Paliwal
(74) *Attorney, Agent, or Firm* — RMCK Law Group, PLC

(57) ABSTRACT

A method performed by a client device of enrolling biometric data of a user with a network node over a secure communication channel comprises capturing the biometric data, transforming the biometric data into a first set of transformed biometric data using a first feature transformation key, generating a second feature transformation key, and transforming the biometric data into a second set of transformed biometric data using the second feature transformation key. The method further comprises encrypting the first and second set of transformed biometric data with an encryption key, encrypting the second feature transformation key with another encryption key shared with the network node at which the first and second sets of transformed biometric data are to be enrolled, and submitting, to the network node, an enrolment request comprising the encrypted first and second sets of transformed biometric data, the encrypted second feature transformation key, and user profile data.

13 Claims, 4 Drawing Sheets

(56) References Cited

U.S. PATENT DOCUMENTS

| | | | |
|---|---|---|---|
| 2008/0065900 A1* | 3/2008 | Lee | H04L 9/3231 |
| | | | 713/186 |
| 2009/0271634 A1* | 10/2009 | Boult | G06F 21/32 |
| | | | 713/186 |
| 2010/0241595 A1 | 9/2010 | Felsher | |
| 2011/0037563 A1 | 2/2011 | Choi et al. | |
| 2011/0047377 A1* | 2/2011 | Allen | H04L 9/0866 |
| | | | 713/168 |
| 2015/0341349 A1 | 11/2015 | Mandal et al. | |
| 2016/0164682 A1 | 6/2016 | Hartloff et al. | |

OTHER PUBLICATIONS

Nandakumar, N., "BioSAKE: Biometrics-based Secure Authentication and Key Exchange," 2013 International Conference on Biometrics (ICB), Jun. 4, 2013, 8 pages.

Sui, Y. et al., "Biometrics-based authentication: a new approach," Computer Communications and Networks (ICCCN), 2011 Proceedings of 20th International Conference on Jul. 31, 2011, 6 pages.

Swedish Search Report dated Jun. 7, 2018 for Swedish Application No. 17514696, 3 pages.

Vigila, S. et al., "Biometric security system over finite field for mobile applications," IET Information Security, 2015, vol. 9, Issue 2, pp. 119-126.

\* cited by examiner

US 10,574,452 B2

TWO-STEP CENTRAL MATCHING

CROSS REFERENCE TO RELATED APPLICATIONS

This application is a continuation of U.S. application Ser. No. 16/117,552, filed on Aug. 30, 2018, which claims priority to Swedish Application No. 1751469-6, filed on Nov. 29, 2017. The disclosures of each of the above applications are incorporated herein by reference in their entirety.

TECHNICAL FIELD

The invention relates to methods and devices of enrolling biometric data of a user with a network node over a secure communication channel. The invention further relates to methods and devices of enabling authentication of a user based on the enrolled biometric data.

BACKGROUND

Biometrics-based identification is a user-friendly way to securely authenticate human users. One major problem with biometric data when using it for identification purposes in distributed systems is that template biometric data must be available at a node in a computer system where the end-user is supposed to be identified. This constitute a major security design challenge in distributed computer system as this typically requires original, clear text biometric data to be stored at a central node and distributed in the system. Such solutions are very vulnerable to original biometric data compromise, and data compromised on one system may lead to a situation where the same biometric data is compromised on all other systems as well where the biometric data is used. Simply encrypting the biometric data will not solve this problem as the original biometric data must be available at the remote location during authentication.

Hence, there is a need to provide solutions that allow remote authentication based on biometric identification but at the same time provide protection of the original biometric data.

SUMMARY

An object of the present invention is to solve, or at least mitigate, this problem in the art and thus to provide an improved method of enabling remote authentication of a user of a client device at a biometric data verification node based on biometric data of the user.

This object is attained in a first aspect of the invention by a method performed by a client device of enrolling biometric data of a user of the client device with a network node over a secure communication channel. The method comprises capturing the biometric data of the user, transforming the biometric data into a first set of transformed biometric data using a first feature transformation key shared with any other client device at which the user is to be authenticated, generating a second feature transformation key, transforming the biometric data into a second set of transformed biometric data using the second feature transformation key, and encrypting the first and second set of transformed biometric data with an encryption key shared with a biometric data verification node at which the user is to be authenticated. The method further comprises encrypting the second feature transformation key with an encryption key shared with the network node at which the first and second sets of transformed biometric data are to be enrolled, and submitting, to the network node, an enrolment request comprising the encrypted first and second sets of transformed biometric data, the encrypted second feature transformation key, and user profile data.

This object is attained in a second aspect of the invention by a client device configured to enrol biometric data of a user of the client device with a network node over a secure communication channel, the client device comprising a biometric data sensing system comprising a biometric data sensor and a processing unit. The biometric data sensor is configured to capture the biometric data of the user. The processing unit is configured to transform the biometric data into a first set of transformed biometric data using a first feature transformation key shared with any other client device at which the user is to be authenticated, generate a second feature transformation key, transform the biometric data into a second set of transformed biometric data using the second feature transformation key, and to encrypt the first and second set of transformed biometric data with an encryption key shared with a biometric data verification node at which the user is to be authenticated. The processing unit is further configured to encrypt the second feature transformation key with an encryption key shared with the network node (300) at which the first and second sets of transformed biometric data are to be enrolled, and to submit, to the network node, an enrolment request comprising the encrypted first and second sets of transformed biometric data, the encrypted second feature transformation key, and user profile data.

This object is attained in a third aspect of the invention by a method performed by a network node of enrolling biometric data of a user of a client device over a secure communication channel. The method comprises receiving, from the client device, an enrolment request comprising encrypted first and a second sets of transformed biometric data of the user, the first set of biometric data having been transformed by a first feature transformation key, and an encrypted second feature transformation key having been used to transform the second set of transformed biometric data, along with user profile data, decrypting the encrypted second feature transformation key, generating a user index for the received second feature transformation key, storing the second feature transformation key, the user profile data and the user index; and submitting, to a biometric data verification node, the encrypted first and second sets of transformed biometric data, the user profile data and the user index.

This object is attained in a fourth aspect of the invention by a network node configured to enrol biometric data of a user of a client device over a secure communication channel. The network node comprises a processing unit being configured to receive, from the client device, an enrolment request comprising encrypted first and a second sets of transformed biometric data of the user, the first set of biometric data having been transformed by a first feature transformation key, and an encrypted second feature transformation key having been used to transform the second set of transformed biometric data, along with user profile data, decrypt the encrypted second feature transformation key, generate a user index for the received second feature transformation key, store the second feature transformation key, the user profile data and the user index, and submit, to a biometric data verification node, the encrypted first and second sets of transformed biometric data, the user profile data and the user index.

This object is attained in a fifth aspect of the invention by a method performed by a biometric data verification node of enrolling biometric data of a user of a client device over a secure communication channel. The method comprises receiving, from a network node configured to communicate with the client device, an enrolment request comprising encrypted first and second sets of transformed biometric data of the user of the client device, the sets of biometric data having been transformed by feature transformation keys not being accessible to the biometric data verification node, user profile data and a user index associated with the received data, decrypting the encrypted first and second sets of transformed biometric data, and storing the first and second sets of transformed biometric data, the user profile data and the user index for subsequent authentication of the user.

This object is attained in a sixth aspect of the invention by a biometric data verification node configured to enrol biometric data of a user of a client device over a secure communication channel. The biometric data verification node comprising a processing unit being configured to receive, from a network node configured to communicate with the client device, an enrolment request comprising encrypted first and second sets of transformed biometric data of the user of the client device, the sets of biometric data having been transformed by feature transformation keys not being accessible to the biometric data verification node, user profile data and a user index associated with the received data, decrypt the encrypted first and second sets of transformed biometric data, and store the first and second sets of transformed biometric data, the user profile data and the user index for subsequent authentication of the user.

This object is attained in a seventh aspect of the invention by a method performed by a client device of enabling authentication of a user of the client device with a network node over a secure communication channel based on biometric data. The method comprises receiving, from the network node, a session value, capturing the biometric data of the user, transforming the biometric data into a first set of transformed biometric data using a first feature transformation key shared with a client device having enrolled biometric data against which authentication is to be performed, encrypting the first set of transformed biometric data and the received session value with an encryption key shared with a biometric data verification node at which the user is to be authenticated, encrypting the session value with an encryption key shared with the network node, submitting the encrypted first set of transformed biometric data, the two encrypted session values and user profile data to the network node, and receiving at least one encrypted second feature transformation key and an encrypted copy of the session value, the at last one second feature transformation key and the session value having been encrypted with a key shared with the network node. The method further comprises decrypting the encrypted at least one second feature transformation key and the encrypted session value and verifying that the decrypted session value complies with the previously received session value, transforming the biometric data into at least one second set of transformed biometric data using the at least one second feature transformation key shared with the network node, encrypting the at least one second set of transformed biometric data and the session value with a key shared with the biometric data verification node, and submitting the encrypted at least one second set of transformed biometric data and the encrypted session value to the network node, wherein the network node forwards the submitted data to the biometric data verification node for authentication of the client device.

This object is attained in a eighth aspect of the invention by a client device configured to enable authentication of a user of the client device with a network node over a secure communication channel based on biometric data. The client device comprises a biometric data sensing system comprising a biometric data sensor and a processing unit. The processing unit is configured to receive, from the network nod, a session value. The biometric data sensor is configured to capture the biometric data of the user. The processing unit is configured to transform the biometric data into a first set of transformed biometric data using a first feature transformation key shared with a client device having enrolled biometric data against which authentication is to be performed, encrypt the first set of transformed biometric data and the received session value with an encryption key shared with a biometric data verification node at which the user is to be authenticated, encrypt the session value with an encryption key shared with the network node, submit the encrypted first set of transformed biometric data, the two encrypted session values and user profile data to the network node, receive at least one encrypted second feature transformation key and an encrypted copy of the session value, the at last one second feature transformation key and the session value having been encrypted with a key shared with the network node, and to decrypt the encrypted at least one second feature transformation key and the encrypted session value and verifying that the decrypted session value complies with the previously received session value. The processing unit is further configured to transform the biometric data into at least one second set of transformed biometric data using the at least one second feature transformation key shared with the network node, encrypt the at least one second set of transformed biometric data and the session value with a key shared with the biometric data verification node, and to submit the encrypted at least one second set of transformed biometric data and the encrypted session value to the network node, wherein the network node forwards the submitted data to the biometric data verification node for authentication of the client device.

This object is attained in a ninth aspect of the invention by a method performed by a biometric data verification node of enabling authentication of a user of a client device over a secure communication channel based on biometric data. The method comprises receiving, from a network node configured to communicate with the client device, an encrypted first set of transformed biometric data, a session value and the session value having been encrypted with a key shared with the client device, as well as user profile data, decrypting the encrypted first set of transformed biometric data and the encrypted session value and verifying that the decrypted session value complies with the received session value, matching the decrypted first set of transformed biometric data to at least one set of transformed biometric data having been previously enrolled for the received user profile data, submitting, to the network node, a user index associated with each of the previously enrolled at least one set of transformed biometric data for which there is match, and the session value, and receiving, from the network node, encrypted at least one second set of transformed biometric data, an encrypted session value and a clear-text copy of the session value. The method further comprises decrypting the encrypted at least one second set of transformed biometric data and the encrypted session value and verifying that the decrypted session value complies with the clear-text session value, matching the decrypted at least one second set of transformed biometric data to at least one set of transformed biometric data having been previously enrolled, and submitting, to the network node, at least one user index for which there is match, along with the session value, wherein the user is considered authenticated.

This object is attained in a tenth aspect of the invention by a biometric data verification node configured to enable authentication of a user of a client device over a secure communication channel based on biometric data. The biometric data verification node comprises a processing unit configured to receive, from a network node configured to communicate with the client device, an encrypted first set of transformed biometric data, a session value and the session value having been encrypted with a key shared with the client device, as well as user profile data, decrypt the encrypted first set of transformed biometric data and the encrypted session value and verifying that the decrypted session value complies with the received session value, match the decrypted first set of transformed biometric data to at least one set of transformed biometric data having been previously enrolled for the received user profile data, submit, to the network node, a user index associated with each of the previously enrolled at least one set of transformed biometric data for which there is match, and the session value, and to receive, from the network node, encrypted at least one second set of transformed biometric data, an encrypted session value and a clear-text copy of the session value. The processing unit is further configured to decrypt the encrypted at least one second set of transformed biometric data and the encrypted session value and verifying that the decrypted session value complies with the clear-text session value, match the decrypted at least one second set of transformed biometric data to at least one set of transformed biometric data having been previously enrolled, and to submit, to the network node, at least one user index for which there is match, along with the session value, wherein the user is considered authenticated.

Advantageously, the invention enables central matching of large user groups without revealing clear text biometrics to a matching back-end server.

In brief, a method is disclosed where protected (e.g. transformed or encrypted) biometric template data kept at a central matching server is used to make identification decisions on behalf of an application server.

Furthermore, the matching is done in a multi-step approach and in transformed/encrypted space or environment.

The invention allows for efficient, high performance, and highly secure central matching against large user sets by combining pre-matching using a first transform with final matching against a second transform. The central matching server does never process any clear text biometrics data, still it will be able to make efficient matching against large user sets using state-of-the-art biometrics matching technologies.

An attacker trying to attack the system must attack both the application server and the matching server to get access to clear text biometrics data and clear text biometrics data is never stored in any type of memory in any of the nodes except for the node that reads the biometrics information from the end-user. However, since the end-user is assumed to present his/her data to the biometrics reader, this data will in any system always be temporarily present at that node when the user is about to be identified. No biometrics data is permanently stored in clear text at any place in the system.

Only part of the biometrics data is transformed using an application wide transform key, while the full biometrics template data is stored with individual transform keys. Attacking this key repository only will not give an attacker any possibility to access an individual end-user's biometrics data or impersonating any individual in the system. Neither will an attack against the matching repository only give any end-user biometrics data.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
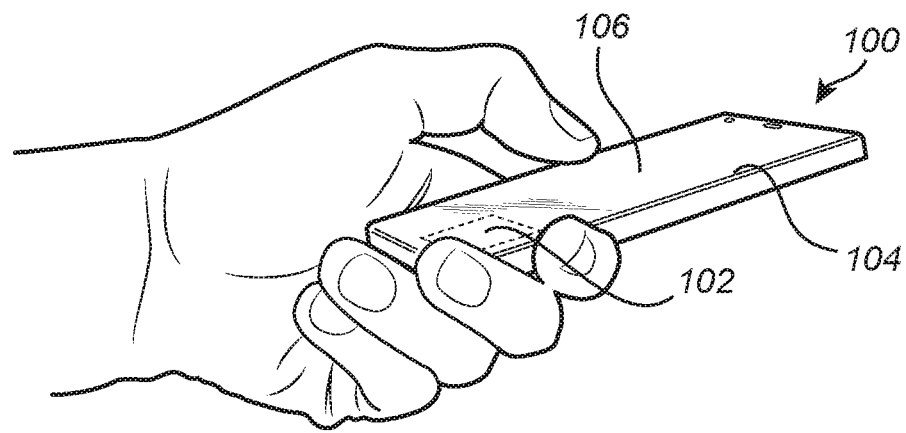
FIG. 1 shows an electronic device in the form of a smart phone in which the present invention may be implemented.

FIG. 1 shows a client device 100 in the form of a smart phone in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, etc., or any other type of present or future similarly configured device utilizing fingerprint sensing.

Figure 2:
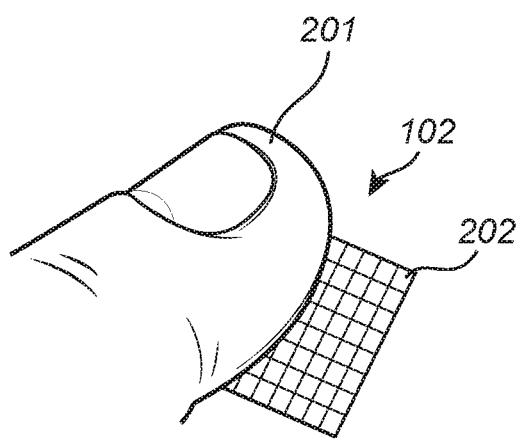
FIG. 2 shows a view of a fingerprint sensor onto which a user places the finger.

FIG. 2 illustrates a somewhat enlarged view of the fingerprint sensor 102 onto which a user places her finger 201. In the case of employing a capacitive sensing technology, the fingerprint sensor 102 is configured to comprise a plurality of sensing elements. A single sensing element (also denoted as a pixel) is in FIG. 2 indicated by reference numeral 202.

Figure 3:
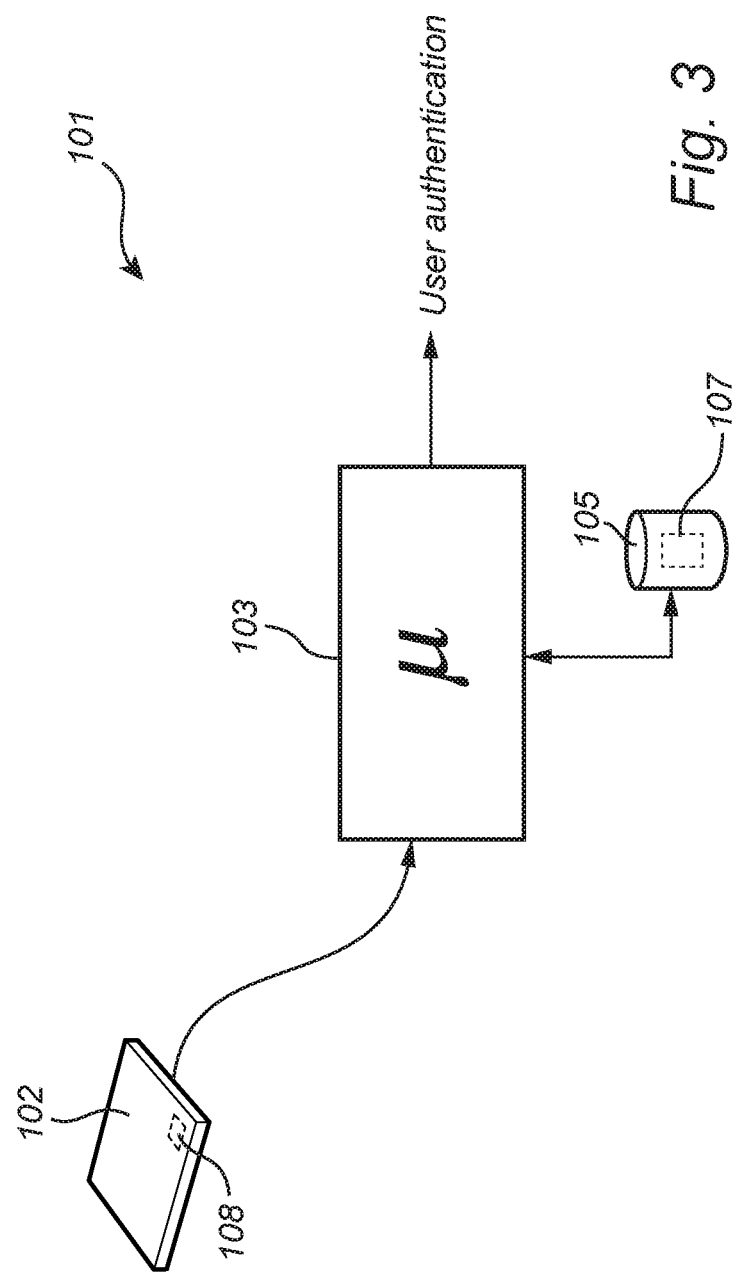
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1.

Now, upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

Alternatively biometric data of a user may be captured using other devices than fingerprint sensors, such as e.g. iris or face recognition sensors. It may further be envisaged that a combination of sensors is used, such as a fingerprint sensor in combination with an iris or face recognition sensor.

In a general authorization process, in case a fingerprint sensor is used, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 (apart from capturing the image, which is carried out by the sensor 102) are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4:
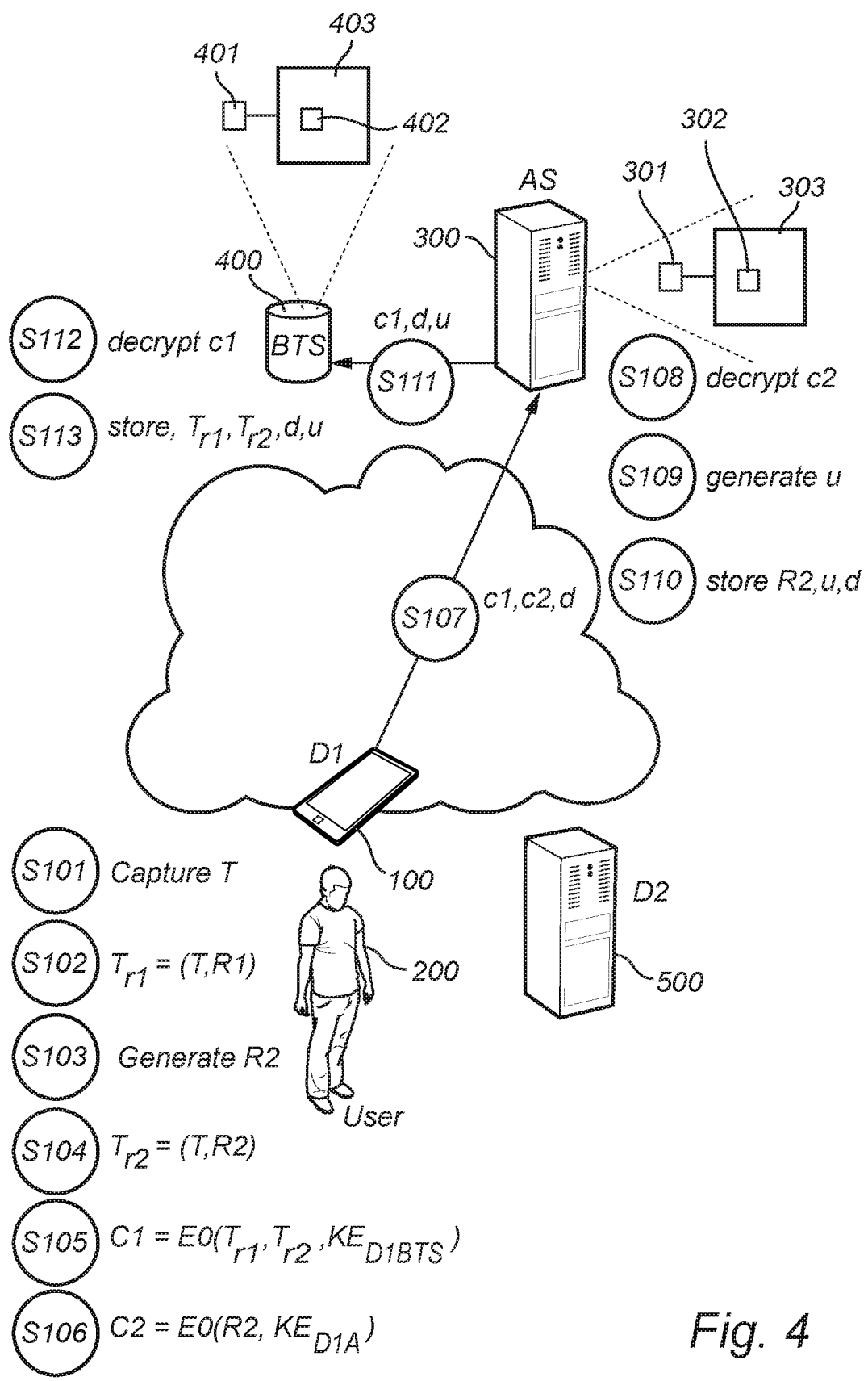
FIG. 4 illustrates a signalling diagram of enrolling transformed biometric data of a user at a trusted server according to an embodiment.

FIG. 4 illustrates an embodiment of enrolling biometric data of a user 200 of a first client device 100 over a secure communication channel with a network node referred to as an application server (AS) 300. The application server 300 will in its turn enrol some of the biometric data of the user 200 at a biometric data verification node referred to as a biometrics trusted server (BTS) 400.

In brief, the first client device 100 embodied e.g. in the form of a smart phone captures biometric data of a user 200, e.g. in the manner described with reference to FIGS. 1-3. This biometric data is then protected at the smart phone and securely registered, or enrolled, with the remotely located trusted AS 300, which stores a subset of the received data (but not the biometric data), and forwards the biometric data to the BTS 400. Subsequently, the user 200 will authenticate herself at a local computing station 500, i.e. a second client device, by having the computing station 500 capture the biometric data of the user, protect the captured biometric data, and have the BTS 400 (via the AS 300) match the protected biometric data with the protected biometric data that previously was registered with the BTS 400.

For instance, the AS 300 may provide one or more services that the user 200 wishes to access, such as an e-commerce service with which the user 200 authenticates herself using biometric data instead of a Personal Identification Number (PIN) to effect a payment of goods bought via the e-commerce service.

This means that the user can login to a remote Web service provided by the AS 300 offering the login procedure according to the invention by presenting her biometric information with an arbitrary (trusted) device supporting the remote authentication procedure. Hence, there is no need for the user to remember any username and/or password or any requirement to carry a certain hardware token, or having a special purpose identification program or credentials stored on the client device used for the login.

Upon successful authentication, the user 200 will be given access to the service provided by the AS 300. It is noted that a clear-text copy of the biometric data of the user 200 never leaves the smart phone 100 or the local computing station 500. It is envisaged that the AS 300 provides a plurality of services, and that different services may be provided to different identified users.

It is noted that the authentication process for the user 200 alternatively may be performed at the first client device 100, i.e. the same device that enrolled the biometric data of the user 200.

It is also possible that the users register with the AS 300 via any one of the local computing stations 500 as an alternative to using their smart phone 100.

In another example, the AS 300 belongs to a service provider such as a car rental company and the second client device 500 could be embodied in the form of a car key device with a biometric reader. When used for this application, the invention allows the car rental company to handle its customers completely online and having car keys available to customers also at unsafe places (out of office hours and at remote locations) without having a high risk of cars being stolen as car keys only can be activated by a user who actually has ordered and paid for a particular car. The user can trust the system as it ensures that the biometric data of the user—even if the biometric data is transferred to the car rental company—never will be available to the car rental company outside the car key device, which can be assumed to be secure. With reference to FIG. 4, the smart phone 100 captures biometric data T of the user 200 in step S101, using e.g. a fingerprint sensor as described with reference to FIGS. 1-3, or for instance an iris or face recognition sensor.

In step S102, the smart phone 100 transforms the captured biometric data T into a first transformed biometric data set Tr1, using a suitable feature transform scheme, i.e. selecting a "feature transform" function that takes an original biometrics template representation and a suitable transform parameter as input parameters and produces a transformed biometrics template information as output.

This may for instance be performed using a secret first feature transformation key R1 having been generated at the smart phone 100 by means of an appropriate pseudorandom function (PRF). Alternatively, the smart phone 100 is preconfigured with the secret first feature transformation key R1 or supplied with the secret first feature transformation key R1 by the AS 300. The first feature transformation key R1 used during enrollment must be shared with any other client device at which the user is to be authenticated, such as e.g. the local computing station 500. The first transformed biometric data set is thus denoted Tr1=F(R1, T).

The smart phone 100 then generates a second feature transformation key R2 in step S103 and creates a second transformed biometric data set based on the captured biometric data T in step S104: Tr2=F(R2, T).

The second feature transformation key R2 is unique for each enrolled second transformed biometric data set Tr2, and it should be noted that a user may enrol a plurality of captured biometric data sets T with the system.

In step S105, the first and second set of transformed biometric data Tr1, Tr2 i encrypted with an encryption key $KE_{D1BTS}$ shared with the BTS 400, which is denoted c1=EO (Tr1, Tr2, $KE_{D1BTS}$).

In an embodiment, c1 is provided with authenticity by means of a symmetric key $KI_{D1BTS}$ shared with the BTS 400, thereby providing a Message Authentication Code (MAC), or with an asymmetric private key of the smart phone 100, thereby providing a digital signature (meaning that the BTS 400 must be provided with the corresponding public key of the smart phone 100).

The smart phone further encrypts, in step S106, the second feature transformation key R2 with an encryption key $KE_{D1A}$ shared with the AS 300 at which the first and second sets of transformed biometric data are to be enrolled, which is denoted c2=EO(R2, $KE_{D1A}$).

In an embodiment, c2 is provided with authenticity by means of a symmetric key $KI_{D1AS}$ shared with the AS 300, thereby providing a MAC, or with an asymmetric private key of the client device 200, thereby providing a digital signature (meaning that the AS 300 must be provided with the corresponding public key of the smart phone 100.

Finally, in step S107, the smart phone 100 submits to the AS 300, over a secure channel, i.e. a communication channel being protected in terms of confidentiality and integrity, e.g. via the Internet, an enrolment request comprising the encrypted first and second sets of transformed biometric data c1, the encrypted second feature transformation key c2, and user profile data d. The user profile data d may be embodied in the form of for example end user name, geographical location, network, etc.

In an embodiment, the user profile data d is encrypted along with the second feature transform key and thus included in c2: c2=EO(R2, d, $KE_{D1A}$).

The AS 300 hence receives the encrypted first and second sets of transformed biometric data c1, the encrypted second feature transformation key c2, and user profile data d, and decrypts the encrypted second feature transformation key c2 in step S108 to obtain the second feature transformation key R2 in clear text (and possibly verifies any provided authenticity of c2).

Thereafter, in step s109, the AS 300 generates a unique user index u for the received second feature transformation key R2 and stores the second feature transformation key R2, the user profile data d2 and the user index u in step S110. It is noted that in case the smart phone 100 enrolls a plurality of biometric templates, a unique user index is generated for each correspondingly received second feature transformation key R2.

The AS 300 further submits in step S111, to the BTS 400, the encrypted first and second sets of transformed biometric data c1, the user profile data d and the user index u, over a secure communication channel.

In the final steps of the enrolment procedure, the BTS 400 thus receives, from the AS 300, the enrolment request comprising encrypted first and a second sets of transformed biometric data c1 of the user 200 of the first client device 100, the user profile data d and the user index u associated with the received data and decrypts the encrypted first and second sets of transformed biometric data in step S112 using the key $KE_{D1BTS}$ shared with the smart phone 100 (and possibly verifies any provided authenticity of c1).

Thereafter, the BTS 400 stores, in step S113 first and second sets of transformed biometric data Tr1, Tr2, the user profile data d and the user index u.

As can be concluded, the BTS 400 does not have access to any one of the first and second feature transformation keys R1, R2, and is thus advantageously incapable of obtaining a clear-text copy of the biometric data T.

Figure 5:
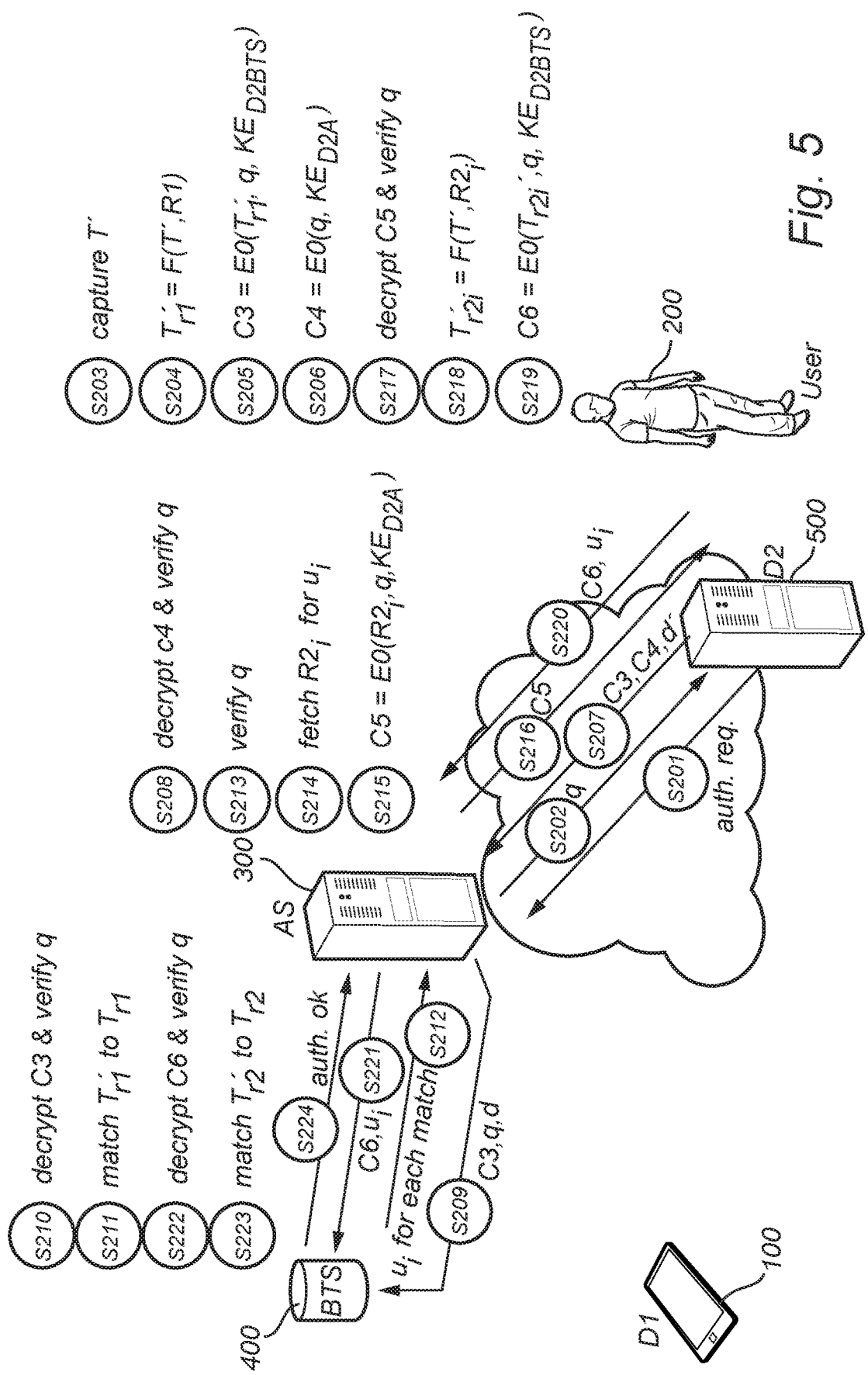
FIG. 5 illustrates a signalling diagram of authenticating a user based on the enrolled transformed biometric data according to another embodiment.

Now, a user wishing to access any of the previously mentioned services of the AS 300 via the local computing station 500 will need to authenticate herself, via the AS 300, with the BTS 400 with which she previously has enrolled, as will be illustrated with reference to the signaling diagram of FIG. 5.

Hence, the user (which in this particular example is assumed to be the user 200 that enrolled with the trusted server in steps S101-S107) may submit in step S201 a request to the AS 300 to authenticate the user 200 of the second client device, i.e. the local computing station 500.

In response thereto, the local station 500 receives a session value q from the AS 300 in step S202 to be used for improving security during the authentication process. During the authentication process, the session value q will be verified by the involved parties in each round of communication between the parties, and if the correctness of q cannot be verified at some point, the operation will be aborted.

It is noted that it may not be the user whom actively submits an authentication request to the AS 300, but instead the AS 300 starts the authentication session by submitting the session value q in step S202 to the local station 500. In such a scenario, step S201 is omitted.

In step S203, the local station 500 (being equipped with a suitable biometric sensor) captures biometric data T' of the user 200 and transforms the captured biometric data T' into a first transformed biometric data set Tr1' with the first feature transformation key R1 used by the smart phone 100 during enrollment of the first set of transformed biometric data Tr1; Tr1'=F(T', R1), in step S204.

Further, in step S205, the local station 500 encrypts the first set of transformed biometric data Tr1' and the session value q with a key $KE_{D2BTS}$ shared with the BTS 400 at which the user 200 is to be authenticated, which is denoted $c3=EO(Tr1', q, KE_{D2BTS})$.

In an embodiment, c3 is provided with authenticity by means of a symmetric key $KI_{D2BTS}$ shared with the BTS 400, thereby providing the message with a MAC, or with an asymmetric private key of the local station 500, thereby providing a digital signature (meaning that the BTS 400 must be provided with the corresponding public key of the local station 500.

Also, in step S206, the local station 500 encrypts the session value q with a key $KE_{D2A}$ shared with the AS 300: $c4=EO(q, KE_{D2A})$ before submitting c3 and c4 to the AS 300 in step S207 along with user profile data d' corresponding to the already enrolled user profile data d for this particular user 200.

In an embodiment, c4 is provided with authenticity by means of a symmetric key $KI_{D2AS}$ shared with the AS 300, thereby providing the message with a MAC, or with an asymmetric private key of the local station 500, thereby providing a digital signature (meaning that the AS 300 must be provided with the corresponding public key of the local station 500.

Thus, the AS 300 receives the encrypted first set of transformed biometric data of the user 200 and the encrypted the session value, both being encrypted with the key $KE_{D2BTS}$ shared with between the local station 500 and the BTS 400, as well as the session value encrypted with the key $KE_{D2A}$ shared between the local station 500 and the AS 300, along with the user profile data d'.

The AS 300 decrypts the received encrypted session value $c4=EO(q, KE_{D2A})$ in step S208 and verifies that the decrypted session value complies with the session value q that was sent in step S202 to the local station 500 (and possibly verifies any provided authenticity of c4).

Thereafter, in step S209, the AS 300 submits the encrypted first set of transformed biometric data and the encrypted session value, i.e. $c3=EO(Tr1', q, KE_{D2BTS})$, the user profile data d', and the session value q to the BTS 400.

The BTS 400 decrypts the encrypted first set of transformed biometric data and the encrypted session value $c3=EO(Tr1', q, KE_{D2BTS})$ in step S210 and verifies that the decrypted session value complies with the received session value q (and possibly verifies any provided authenticity of c3).

Thereafter, in step S211, the BTS 400 matches the decrypted first set of transformed biometric data Tr1' to at least one set of transformed biometric data Tr1 having been previously enrolled for the received user profile data d', i.e. for which d'=d.

It should be noted that the BTS 400 typically stores a large number of enrollments; thousands of users may be enrolled with the BTS 400. A plurality of enrolled transformed biometric data sets Tr1i stored at the BTS 400 may thus be considered to match the received first set of transformed biometric data Tr1'. These are referred to as candidate enrollment sets.

Therefore, for each matching transformed biometric data set constituting the candidate enrollment sets, the BTS 400 returns the associated user index $u_i$ to the AS 300, along with the session value q, in step S212.

Hence, a "pre-match" is advantageously performed at the BTS 400 utilizing the received first set of transformed biometric data Tr1' to fetch the adequate candidate enrollment sets, having as an effect that a largely reduced number of candidate enrollment sets subsequently will need to be considered by the computing station 500 as compared to a scenario where the pre-match is not performed.

Now, upon receiving the user indices $u_i$ and the session value q, the AS 300 verifies in step S213 that the session value q complies with the session value that previously was sent to the AS 400 in step S209.

For each received user index $u_i$, the AS 300 fetches, from an appropriate storage, a previously enrolled second feature transformation key $R2_i$ associated with each particular user index $u_i$ in step S214 and encrypts each enrolled second feature transformation key $R2_i$, and the session value q with the key $KE_{D2A}$ shared with the local station 500 in step S215: $c5=EO(R2_i, q, KE_{D2A})$, and submits c5 to the local station 500 in step S216.

In an embodiment, c5 is provided with authenticity by means of a symmetric key $KI_{D2AS}$ shared with the AS 300, thereby providing the message with a MAC, or with an asymmetric private key of the local station 500, thereby providing a digital signature (meaning that the AS 300 must be provided with the corresponding public key of the local station 500).

The local station 500 decrypts the encrypted at least one second feature transformation key and the encrypted session value, c5, using the shared key $KE_{D2A}$ in step S217 and verifies that the decrypted session value q complies with the session value previously received in step S202 (and possibly verifies any provided authenticity of c5).

The local station 500 then uses each received second feature transformation key $R2_i$ to transform the captured biometric data T' into a corresponding number i of second sets of transformed biometric data: $Tr2_i'=(T', R2_i)$ in step S218, encrypts the second sets of transformed biometric data $Tr2_i'$ and the session value q with the key $KE_{D2BTS}$ shared with the BTS 400: $c6=EO(Tr2_i', q, KE_{D2BTS})$, in step S219, and submits c6 to the AS 300 in step S220 for final matching.

In an embodiment, c6 is provided with authenticity by means of a symmetric key $KI_{D2BTS}$ shared with the BTS 400, thereby providing the message with a MAC, or with an asymmetric private key of the local station 500, thereby providing a digital signature (meaning that the BTS 400 must be provided with the corresponding public key of the local station 500).

The AS 300 will in its turn forward c6 and the session value q in step S221 to the BTS 400 for final matching. The AS 300 may forward c6, i.e. each second set of transformed biometric data $Tr2_i'$, in the same order as the candidate enrolment sets were received from the BTS 400 in step S212. If so, the BTS 400 knows to which particular user index $u_i$ each respective second set of transformed biometric data $Tr2_i'$ belongs when performing the matching.

The BTS 400 decrypts, in step S222, the encrypted at least one second set of transformed biometric data and the encrypted session value, c6, and verifies that the decrypted session value q complies with the clear-text session value (and possibly verifies any provided authenticity of c6).

Thereafter, in step S223, the BTS 400 matches the decrypted second sets of transformed biometric data $Tr2_i'$ to the corresponding second sets of transformed biometric data $Tr2_i$ having been previously enrolled for the user index $u_i$. Again, since at least one second set of transformed biometric data Tr2 is enrolled for each user—the number of users amounting to hundreds or even thousands—the matching may be a burdensome task in terms of data processing.

Finally, the BTS 400 submits in step S224 to the AS 300, at least one user index $u_i$ for which there is match, along with the session value q, wherein the user 200 is considered authenticated. From the received user index (or user indices), the AS 300 can identify the user 200 from the associated user profile data d.

Upon receiving the confirmation from the BTS 400 that at least one of the second sets of transformed biometric data Tr2' has been matched to a previously enrolled second set of transformed biometric data Tr2, the AS 300 concludes that the user 200 at the local station 500 has been authenticated (and identified by means of the user profile data d associated with any received user index u), and may send a confirmation to the local station 500 accordingly in step S225, in which case the user 200 for instance is given access to via the computing station 500, a service provided by the AS 300.

Advantageously, as can be concluded from the above, no clear text biometric data leaves either of the client devices 100, 500, while secure authentication still is provided, which considerably can increase a user's trust in using the system.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a client device of enrolling biometric data of a user of the client device with a network node over a secure communication channel, comprising:
   capturing the biometric data of the user;
   transforming the biometric data into a first set of transformed biometric data using a first feature transformation key shared with any other client device at which the user is to be authenticated;
   generating a second feature transformation key;
   transforming the biometric data into a second set of transformed biometric data using the second feature transformation key;
   encrypting the first and second set of transformed biometric data with an encryption key shared with a biometric data verification node at which the user is to be authenticated;
   encrypting the second feature transformation key with an encryption key shared with the network node at which the first and second sets of transformed biometric data are to be enrolled; and
   submitting, to the network node, an enrolment request comprising the encrypted first and second sets of transformed biometric data, the encrypted second feature transformation key, and user profile data.

2. The method of claim 1, wherein the encrypting of the first and second set of transformed biometric data further comprises:
   providing the first and second set of transformed biometric data with authenticity to be verified by the biometric data verification node.

3. The method of claim 1, wherein the encrypting of the second feature transformation key further comprises:
   providing the second feature transformation key with authenticity to be verified by the network node.

4. A method performed by a network node of enrolling biometric data of a user of a client device over a secure communication channel, comprising:
   receiving, from the client device, an enrolment request comprising encrypted first and a second sets of transformed biometric data of the user, the first set of biometric data having been transformed by a first feature transformation key, and an encrypted second feature transformation key having been used to transform the second set of transformed biometric data, along with user profile data;
   decrypting the encrypted second feature transformation key;
   generating a user index for the received second feature transformation key;
   storing the second feature transformation key, the user profile data and the user index; and
   submitting, to a biometric data verification node, the encrypted first and second sets of transformed biometric data, the user profile data and the user index.

5. A method performed by a biometric data verification node of enrolling biometric data of a user of a client device over a secure communication channel, comprising:
   receiving, from a network node configured to communicate with the client device, an enrolment request comprising encrypted first and second sets of transformed biometric data of the user of the client device, the sets of biometric data having been transformed by feature transformation keys not being accessible to the biometric data verification node, user profile data and a user index associated with the received data;
   decrypting the encrypted first and second sets of transformed biometric data; and
   storing the first and second sets of transformed biometric data, the user profile data and the user index for subsequent authentication of the user.

6. A client device comprising a biometric data sensing system comprising a biometric data sensor and at least one processor and being configured to perform a method of enrolling biometric data of a user of the client device with a network node over a secure communication channel, the method comprising:
   capturing the biometric data of the user;
   transforming the biometric data into a first set of transformed biometric data using a first feature transformation key shared with any other client device at which the user is to be authenticated;
   generating a second feature transformation key;
   transforming the biometric data into a second set of transformed biometric data using the second feature transformation key;
   encrypting the first and second set of transformed biometric data with an encryption key shared with a biometric data verification node at which the user is to be authenticated;
   encrypting the second feature transformation key with an encryption key shared with the network node at which the first and second sets of transformed biometric data are to be enrolled; and
   submitting, to the network node, an enrolment request comprising the encrypted first and second sets of transformed biometric data, the encrypted second feature transformation key, and user profile data.

7. The client device of claim 6, further being configured to:
   provide the first and second set of transformed biometric data with authenticity to be verified by the biometric data verification node.

8. The client device of claims 6, further being configured to:
   provide the second feature transformation key with authenticity to be verified by the network node.

9. A network node comprising a memory and at least one processor, and being configured to perform a method of enrolling biometric data of a user of a client device over a secure communication channel, the method comprising:

receiving, from the client device, an enrolment request comprising encrypted first and a second sets of transformed biometric data of the user, the first set of biometric data having been transformed by a first feature transformation key, and an encrypted second feature transformation key having been used to transform the second set of transformed biometric data, along with user profile data;

decrypting the encrypted second feature transformation key;

generating a user index for the received second feature transformation key;

storing the second feature transformation key, the user profile data and the user index; and submitting, to a biometric data verification node, the encrypted first and second sets of transformed biometric data, the user profile data and the user index.

10. A biometric data verification node comprising a memory and at least one processor, and being configured to perform a method of enrolling biometric data of a user of a client device over a secure communication channel, the method comprising:

receiving, from a network node configured to communicate with the client device, an enrolment request comprising encrypted first and second sets of transformed biometric data of the user of the client device, the sets of biometric data having been transformed by feature transformation keys not being accessible to the biometric data verification node, user profile data and a user index associated with the received data;

decrypting the encrypted first and second sets of transformed biometric data; and storing the first and second sets of transformed biometric data, the user profile data and the user index for subsequent authentication of the user.

11. A computer program product comprising a non-transitory computer readable medium having a plurality of instructions stored thereon, which, when executed by one or more processors of a client device, cause the one or more processors to perform a method of enrolling biometric data of a user of the client device with a network node over a secure communication channel, the method comprising:

capturing the biometric data of the user;

transforming the biometric data into a first set of transformed biometric data using a first feature transformation key shared with any other client device at which the user is to be authenticated;

generating a second feature transformation key;

transforming the biometric data into a second set of transformed biometric data using the second feature transformation key;

encrypting the first and second set of transformed biometric data with an encryption key shared with a biometric data verification node at which the user is to be authenticated;

encrypting the second feature transformation key with an encryption key shared with the network node at which the first and second sets of transformed biometric data are to be enrolled; and submitting, to the network node, an enrolment request comprising the encrypted first and second sets of transformed biometric data, the encrypted second feature transformation key, and user profile data.

12. A computer program product comprising a non-transitory computer readable medium having a plurality of instructions thereon, which, when executed by one or more processors of a network node, cause the one or more processors to perform a method of enrolling biometric data of a user of a client device over a secure communication channel, the method comprising:

receiving, from the client device, an enrolment request comprising encrypted first and a second sets of transformed biometric data of the user, the first set of biometric data having been transformed by a first feature transformation key, and an encrypted second feature transformation key having been used to transform the second set of transformed biometric data, along with user profile data;

decrypting the encrypted second feature transformation key;

generating a user index for the received second feature transformation key;

storing the second feature transformation key, the user profile data and the user index; and submitting, to a biometric data verification node, the encrypted first and second sets of transformed biometric data, the user profile data and the user index.

13. A computer program product comprising a non-transitory computer readable medium having a plurality of instructions thereon, which, when executed by one or more processors of a biometric data verification node, cause the one or more processors to perform a method of enrolling biometric data of a user of a client device over a secure communication channel, the method comprising:

receiving, from a network node configured to communicate with the client device, an enrolment request comprising encrypted first and second sets of transformed biometric data of the user of the client device, the sets of biometric data having been transformed by feature transformation keys not being accessible to the biometric data verification node, user profile data and a user index associated with the received data;

decrypting the encrypted first and second sets of transformed biometric data; and storing the first and second sets of transformed biometric data, the user profile data and the user index for subsequent authentication of the user.

* * * * *